United States Patent [19]

Lee

[11] Patent Number: 5,397,500
[45] Date of Patent: Mar. 14, 1995

[54] COMPOSITIONS FOR TREATING WASTE WATER WHICH CONTAINS HEAVY METALS

[76] Inventor: Jong-Chan Lee, 3-202, Samchang Apt., 86-23, Sinjeong2-dong, Yangcheongu, Seoul City, Rep. of Korea

[21] Appl. No.: 195,924

[22] Filed: Feb. 14, 1994

[51] Int. Cl.$^6$ .............................................. C02F 5/02
[52] U.S. Cl. .................................. 252/179; 252/175; 210/679; 210/638
[58] Field of Search ............... 252/175, 179, 181, 178; 210/679, 681, 638

[56] References Cited

U.S. PATENT DOCUMENTS

| | | | |
|---|---|---|---|
| 2,206,691 | 7/1940 | Furness et al. | 252/179 |
| 4,079,019 | 3/1978 | Scherzer et al. | 502/65 |
| 4,094,778 | 6/1978 | Denny et al. | 252/179 |
| 4,853,130 | 8/1989 | D'Angelo et al. | 210/663 |
| 5,264,133 | 11/1993 | Forschner et al. | 210/679 |

FOREIGN PATENT DOCUMENTS

| | | |
|---|---|---|
| 283978 | 9/1988 | European Pat. Off. |
| 107992 | 5/1986 | Japan . |
| 40-48999 | 2/1992 | Japan . |
| 8701965 | 4/1987 | WIPO . |

OTHER PUBLICATIONS

Hawley's Condensed Chemical Dictionary, 11th Ed. Van Nostrand Reinhold NY 1987, p. 811, 1249.

Primary Examiner—Prince Willis, Jr.
Assistant Examiner—James M. Silbermann
Attorney, Agent, or Firm—Harris Zimmerman

[57] ABSTRACT

A composition for treating waste water comprising Natrolite [$Na_2Al_2Si_3O_{10} \cdot 2H_2O$] from 30 to 40 weight %, Montmorillonite from 20 to 30 weight %, Calcium hydroxide [$Ca(OH)_2$] from 20 to 30 weight %, Aluminum sulphate [$Al_2(SO_4)_3 \cdot 7H_2O$] from 1.5 to 3.5 weight % and Magnesium oxide catalyst agent from 10 to 15 weight percent. The composition is effective in treating waste water containing various heavy metals, particularly, Cu, Ni, Zn, Fe, Pb, $Cr^{6+}$ and cyanide and in deoderizing and decreasing chemical oxygen demand (COD).

3 Claims, No Drawings

COMPOSITIONS FOR TREATING WASTE WATER WHICH CONTAINS HEAVY METALS

BACKGROUND OF THE INVENTION

This invention relates to compositions for treating industrial waste water which contains heavy metals, and more particularly to compositions for treating waste water which comes out of industrial plants using a process of metal coating, paint production, leather treatment, dyeing, production of medicine or production of lube oil. The compositions comprises natrolite, montmorillonite, calcium hydroxide, aluminum sulphate and catalyst agent.

An outflow of waste water which contains untreated heavy metals may cause contamination of lands or rivers. Furthermore, such untreated waste water may cause serious diseases, such as minamata disease caused by mercury poisoning, beause it is introduced into and accumulated in the human body through the food chain.

Industrial plants utilizing a process of metal coating, paint production, leather treatment, dyeing, production of medicine or production of lube oil generally discharge waste water containing various heavy metals. Consequently, effective methods of treating the various heavy metal containing waste water are strongly required in view of the environment protection and public hygine.

There have been proposed and used various methods of treating heavy metal containing waste water, i.e. neutralization method by using alkali, coagulation and precipitation method, ion exchange method, chelate compound formation method.

These conventional methods are limited in their treating effects and not economical. For treating waste water containing various kinds of heavy metals, the conventional methods have been combined when in use.

SUMMARY OF THE INVENTION

An object of the present invention in which the above described disadvantages are eliminated is to provide compositions for treating waste water containing various kinds of heavy metals.

The compositions comprises natrolite, montmorillonite, calcium hydroxide, aluminum sulphate and catalyst agent.

The compositions according to the present invention comprises:

| | |
|---|---|
| Natrolite [$Na_2Al_2Si_3O_{10}.2H_2O$] | 30–40 (wt %) |
| Montmorillonite [$SiO_2$, $Al_2O_3$, $Na_2O$, etc.] | 20–30 (wt %) |
| Calcium hydroxide [$Ca(OH)_2$] | 20–30 (wt %) |
| Aluminum sulphate [$Al_2(SO_4)_3.7H_2O$] | 1.5–3.5 (wt %) |
| Catalyst agent [MgO] | 10.0–15.0 (wt %) |

Preferably, the composition according to the present invention comprises:

| | |
|---|---|
| Natrolite [$Na_2Al_2Si_3O_{10}.2H_2O$] | 35 (wt %) |
| Montmorillonite [$SiO_2$, $Al_2O_3$, $Na_2O$, etc.] | 25 (wt %) |
| Calcium hydroxide [$Ca(OH_2)$] | 25 (wt %) |
| Aluminum sulphate [$Al_2(SO_4)_3.7H_2O$] | 2.5 (wt %) |
| Catalyst agent [MgO] | 12.5 (wt %) |

The main component of the present invention, natrolite is inexhaustibly contained in Gabbro, basalts, etc. The natrolite is a basic moisture containing silicate as a column-shaped radial aggregate.

Natrolite, as zeolite minerals, contains about 74% of $SiO_2$, about 1.4% of $Fe_2O_3$, about 0.12% of CaO, about 4.4% of MgO, about 1.8% of $K_2O$ and about 1.2% of $Na_2O$. The natrolite having the following characteristics is a useful component of compositions for treating heavy metal containing waste water:

First, the crystal structure of natrolite has a property that it is not destroyed at a high temperature of about 700° C. and below, even after the moisture contained in the crystal lattice of the natrolite molecule is escaped. Fine porosities of $3 \sim 10$ Å diameter are formed at the place where the moisture is escaped. The fine porosities have a property that they adsorb other heavy metal atoms or ions in aqueous solution.

Secondly, the crystal structure of the natrolite is tetrahedral, with oxygens enclosing silicate. The centered silicate may be substituted for aluminum at a part thereof. To compensate for positive charges, other positive charges in positive charge containing solution is substituted for. With such ion exchange property of natrolite, heavy metals are substituted, adsorbed and precipitated.

Third, the natrolite having fine porosities of $3 \sim 10$ 521 diameter serves as a filter. That is, the natrolite functions as a molecular sieve which optionally adsorb or filter fine liquid molecule of $3 \sim 10$ Å or inorganic materials contained in solution.

With the above-described properties of natrolite, substitution, adsorption, coagulation and precipitation of heavy metals in waste water are performed.

Another compound of the composition of the present invention, montmorillonite, belongs to a $SiO_2$—$Al_2O_3$ group containing about 59% of $SiO_2$ about 14% of $Al_2O_3$ and about 3.5% of $Na_2O$. The montnorillonite is distributed widely in felspar or clay minerals. The adsorption and ion exchange by the porosity of $SiO_2$—$Al_2O_3$ enables the montmorillonite to perform complementary cooperation together with the natrolite when it is used with the natrolite.

The montmorillonite is not soluble in water, but it absorbs the moisture in a solution and expands 8 to 12 times as large as the original particle size thereof. This property improves the heavy metal adsorption capacity of the montmorillonite in the solution.

Another compound of the composition of the present invention, calcium hydroxide [$Ca(OH)_2$], reacts with CO or $CO_2$ in a solution to produce $CaCO_3$, thereby performs deodorizing and chromaticity decreasing operations.

In addition, the calcium hydroxide neutralizes waste acid water which affects adversely to farming lands or other industrial facilities. When the calcium hydroxide is used with a coagulant, it treats a heavy metal chelate compound, and thereby improves the heavy metal treating capacity of the composition of the present invention.

Another compound, aluminum sulphate, is added to the composition of the present invention to perform as a coagulant. The catalyst agent is added to the composition of the present invention to expedite the adsorption, precipitation and coagulation with respect to the heavy metals. The catalyst agent organically performs complementary cooperation with the other compounds of the composition of the present invention and maximize the heavy metal treating effect.

The composition comprising the above-described compounds has an excellent effect in treating waste water which contains Cu, Ni, Zn, Fe, Pb, $Cr^{6+}$ and cyanide and in remarkably decreasing deodorizing function and chemical oxygen demand.

DETAILED DESCRIPTION OF THE INVENTION

The compound of the present invention is detailed below with reference to manufacturing and operation examples, but the scope of the present invention is not limited to the examples.

Manufacturing Example

Natrolite compound contained in Gabbro and basalts was chosen and pulverized to have suitable sizes, and then separated by a gravity concentration to obtain $SiO_2$ 74%, $Al_2O_3$ 16%, $Fe_2O_3$ 1.4%, CaO 0.12%, MgO 4.4%, $K_2O$ 1.8% and $Na_2O$ 1.2%. Thereafter, the separated compounds were dried and pulverized to have 100 to 200 mesh size. In the same way, montmorillonite compound was obtained and dried by ventilation, and then pulverized to have 100 to 200 mesh size. The pulverization and separation were performed at the dressing field of Wolyoo mining station located at Yongdong, Choongbook, Republic of Korea.

The obtained natrolite powder and montmorillonite powder were mixed to commercially available calcium hydroxide, aluminum sulphate and MgO at a below rate to obtain the composition of the present invention:

| | |
|---|---|
| Natrolite | 35 (wt %) |
| Montmorillonite | 25 (wt %) |
| Calcium hydroxide | 25 (wt %) |
| Aluminum sulphate | 2.5 (wt %) |
| MgO | 12.5 (wt %) |

Operating Example

A sample of 500 ml of untreated waste water was agitated by a magnetic agitator for approximately five minutes for activating heavy metal constituents in the waste water. The agitated waste water was controlled to have pH 7 by using acid or alkali to have the same pH as the industrial water. One gram of the composition manufactured by the above described manufacturing example was added to the waste water.

After about fifteen minutes, coagulation started. After twenty minutes, heavy metals were precipitated and separated from liquid face. After five minutes of complete precipitation, sludges containing heavy metals were compressed and coagulated and then disposed. The amount of heavy metals in the separated liquid was measured. For the measurement, clorimetry of WAK-COD type at physics and chemistry public laboratory in Japan. pH measurement was performed by whole range test paper (pH 0.0~14.0) manufactured by Dongyang Yoji Co., Ltd. of Japan.

The above-described experiment was applied to thirty times with respect to the waste water from metal coating plants, twenty eight times with respect to the waste water from paint plants, twenty five times with respect to the waste water from leather manufacturing plants and forty times with respect to the waste water from other plants. The obtained result is shown in the following table.

TABLE

| Test Item | Result |
|---|---|
| Ni | Nil |
| Cu | 0.07 ppm |
| CN | Nil |
| $Cr^{6+}$ | Nil |
| Fe | Nil |
| Pb | Nil |
| COD | 20 ppm |
| | (before treatment: 500 ppm) |

As shown in the table, the composition of the present invention has an excellent effect of eliminating heavy metals in waste water and of remarkably decreasing COD (chemical oxygen demand).

What is claimed is:

1. A composition for treating waste water which contains heavy metals comprising:

| | |
|---|---|
| Natrolite [$Na_2Al_2Si_3O_{10} \cdot 2H_2O$] | 30-40 (wt %) |
| Montmorillonite | 20-30 (wt %) |
| Calcium hydroxide [$Ca(OH)_2$] | 20-30 (wt %) |
| Aluminum sulphate [$Al_2(SO_4)_3 \cdot 7H_2O$] | 1.5-3.5 (wt %) |
| Catalyst agent [MgO]. | 10.0-15.0 (wt %) |

2. A composition as claimed in claim 1, containing 35% by weight of natrolite, 25% by weight of montmorillonite, 25% by weight of calcium hydroxide, 2.5% by weight of aluminum sulphate and 12.5% by weight of catalyst agent.

3. A composition as claimed in claims 1 or 2, wherein the natrolite is the main component.

* * * * *